United States Patent
Xiao et al.

(10) Patent No.: US 9,327,401 B2
(45) Date of Patent: May 3, 2016

(54) METHOD OF CONTROLLING A REDUNDANT ROBOT

(71) Applicant: Fanuc America Corporation, Rochester Hills, MI (US)

(72) Inventors: Di Xiao, Rochester Hills, MI (US); Sai-Kai Cheng, Rochester Hills, MI (US); Randy A. Graca, Macomb, MI (US); Matthew R. Sikowski, Clarkston, MI (US); Jason Tsai, Bloomfield Hills, MI (US)

(73) Assignee: Fanuc America Corporation, Rochester Hills, MI (US)

( * ) Notice: Subject to any disclaimer, the term of this patent is extended or adjusted under 35 U.S.C. 154(b) by 84 days.

(21) Appl. No.: 14/021,051

(22) Filed: Sep. 9, 2013

(65) Prior Publication Data

US 2014/0074289 A1     Mar. 13, 2014

Related U.S. Application Data

(60) Provisional application No. 61/699,028, filed on Sep. 10, 2012, provisional application No. 61/710,082, filed on Oct. 5, 2012.

(51) Int. Cl.
    *B25J 9/16*         (2006.01)

(52) U.S. Cl.
CPC ............... *B25J 9/163* (2013.01); *B25J 9/1643* (2013.01); *G05B 2219/40333* (2013.01); *G05B 2219/40367* (2013.01); *Y10S 901/03* (2013.01); *Y10S 901/16* (2013.01); *Y10S 901/28* (2013.01); *Y10S 901/43* (2013.01)

(58) Field of Classification Search
None
See application file for complete search history.

(56) References Cited

U.S. PATENT DOCUMENTS

| | | | | |
|---|---|---|---|---|
| 4,937,759 A * | 6/1990 | Vold | B25J 9/1602 | 700/262 |
| 4,967,126 A * | 10/1990 | Gretz | B25J 9/1612 | 318/567 |
| 4,975,856 A * | 12/1990 | Vold | B25J 9/1602 | 318/568.19 |
| 5,294,873 A * | 3/1994 | Seraji | B25J 9/1638 | 318/561 |
| 5,430,643 A | 7/1995 | Seraji | | |
| 5,499,320 A * | 3/1996 | Backes | B25J 9/1602 | 700/260 |
| 5,550,953 A * | 8/1996 | Seraji | B25J 9/162 | 700/262 |
| 5,811,951 A * | 9/1998 | Young | B25J 9/042 | 318/568.1 |
| 7,236,850 B2 * | 6/2007 | Kim | B25J 9/1015 | 318/560 |
| 7,646,161 B2 * | 1/2010 | Albu-Schaffer | A61B 19/22 | 248/274.1 |
| 8,428,781 B2 * | 4/2013 | Chang | B25J 9/162 | 104/53 |

* cited by examiner

*Primary Examiner* — Nicholas Kiswanto
(74) *Attorney, Agent, or Firm* — Fraser Clemens Martin & Miller LLC; William J. Clemens

(57) ABSTRACT

A method for controlling a redundant robot arm includes the steps of selecting an application for performing a robotic process on a workpiece with the arm and defining at least one constraint on motion of the arm. Then an instruction set is generated based upon the selected application representing a path for a robot tool attached to the arm by operating the arm in one of a teaching mode and a programmed mode to perform the robotic process on the workpiece and movement of the arm is controlled during the robotic process. A constraint algorithm is generated to maintain a predetermined point on the arm to at least one of be on, be near and avoid a specified constraint in a robot envelope during movement of the arm, and a singularity algorithm is generated to avoid a singularity encountered during the movement of the arm.

20 Claims, 6 Drawing Sheets

METHOD OF CONTROLLING A REDUNDANT ROBOT

This application claims priority to U.S. Provisional Patent Application Ser. No. 61/699,028 filed Sep. 10, 2012 hereby incorporated herein by reference in its entirety and U.S. Provisional Patent Application Ser. No. 61/710,082 filed Oct. 5, 2012 hereby incorporated herein by reference in its entirety.

FIELD OF THE INVENTION

This invention relates generally to robot controllers and, more particularly, to a control method for controlling the movement of a redundant robot.

BACKGROUND OF THE INVENTION

Industrial robots have historically used six joint axes or less. Since there are six possible Cartesian degrees of freedom (represented by x, y, z, w, p, r), it is typically desirable to have one joint axis for each degree of freedom.

The practice of using six joint axes or less, though, causes difficulty for certain robot applications. Therefore, there are many advantages to adding a seventh axis. Particularly in line tracking applications, for example, as the line moves by way of conveyor, it is impossible to control a six axis robot to avoid a robot collision because there are not enough degrees of freedom. For painting applications, line tracking applications are very important so that the workpiece to be painted can travel on a moving conveyor. Line tracking applications are therefore widely used in the industry of painting applications. Paint robot systems have long used a linear rail to add a seventh axis, but the linear rail takes up space and adds cost to the painting operation.

One solution is to add a seventh axis to the robot, but without a linear rail. As there are still only six possible Cartesian degrees of freedom, such a robot offers an extra degree of freedom that is considered redundant. Redundant robots have more joint axes than the Cartesian degrees of freedom. A robot with seven or more joint axes will be a redundant robot. In fact, there are many advantages, to adding a seventh axis. See, for example, U.S. Pat. No. 5,430,643. Redundant robots provide the flexible dexterity that can be used for many purposes such as collision avoidance, while accomplishing a programmed task. Redundant robots can also apply to robots with less than seven axes and six degrees of freedom. For example, a five axis door opener robot that requires four degrees of freedom for its task is also redundant.

Currently, a six axis robot with a linear rail as the seventh axis is often used in line tracking applications. The advantage is that the linear rail compensates for the movement of line conveyor. For a given point on a workpiece that is moving with the line conveyor, joint angles of the six axis robot could be repeatable regardless of the line conveyor location. With a six axis robot on a linear rail, it is easy for a user to teach and playback a programmed path of the robot to accomplish a desired task. However, a linear rail is expensive and takes up space. For paint applications, the size of a paint booth to compensate for the linear rail also adds more to the cost.

It is therefore desirable to have a robot with a redundant seventh axis that replaces the rail. For paint applications, the seven axis redundant robot provides the flexible dexterity that can be used for many purposes such as collision avoidance, while accomplishing a task, but within a much smaller paint booth size compared to the traditional six axis robot on a linear rail. Similarly, it is desirable to have a door opener robot with a fifth redundant axis that replaces the rail.

However, the redundant axis does present problems. First, the compact space occupied by the redundant robot increases the probability of a collision with obstacles, the workpiece, and other equipment in the area. Second, it is very difficult for a user to predict whether or not a collision between the robot and the workpiece could occur because the workpiece is moving. Third, the joint angles of the robot are not repeatable to reach a given point that is moving with the line conveyor. Fourth, the programming of a seven axis redundant robot is very complex and difficult. The user is familiar with programming the six axis robot for the six positions x, y, z, w, p, r. The user is not typically familiar with programming the extra degree of freedom gained from the seven axis robot. Fifth, the redundant axis creates a singularity when it is aligned in a straight line with a major axis which can create unpredictable robot motion and velocities. While approaching a singular configuration, a task level controller of the robot generates high robot joint torques that result in instability or large errors in a task space. A task level controller is not only unstable at the singular configuration, but also unstable in a vicinity of the singular configuration. When singularity occurs, the robot may still have six degrees of freedom. That is, a tool center point (TOP) of the robot still can move in any direction. However, the singularity affects the controllability of the robot with respect to the axes and results in very fast motions of the robot about major axes.

The prior art has been inadequate in a number of ways. First, the prior art is normally based on a Jacobian matrix which has been complex and unstable. A more stable solution for the collision and singularity problems is needed. Second, the prior art has not addressed line tracking applications. Third, the prior art has not solved the complexity and difficulty of programming a robot with seven axes. It would be advantageous if methods of controlling a redundant robot could be improved.

SUMMARY OF THE INVENTION

According to an embodiment of the invention, a method for controlling a redundant robot arm comprises the steps of: selecting an application for performing a robotic process on a workpiece; generating an instruction set based upon the selected application representing a path for a robot tool attached to the redundant robot arm by operating the redundant robot arm in one of a teaching mode and a programmed mode to perform the robotic process on the workpiece; and controlling the redundant robot arm during the robotic process to maintain a predetermined point on the redundant robot arm to at least one of be on, be near and avoid a specified constraint in a robot envelope.

According to another embodiment of the invention, a method for controlling a redundant robot arm comprises the steps of: selecting an application for performing a robotic process on a workpiece; generating an instruction set based upon the selected application representing a path for a robot tool attached to the redundant robot arm by operating the redundant robot arm in one of a teaching mode and a programmed mode to perform the robotic process; modifying the path of an elbow point of the redundant robot arm to avoid a singularity position of the redundant robot arm; and controlling the redundant robot arm in accordance with the modified path of the elbow point whereby the singularity position is avoided while the redundant robot arm is performing the robotic process on the workpiece.

According to yet another embodiment of the invention, a method for controlling a redundant robot arm comprising the steps of: selecting an application for performing a robotic process on a workpiece with the redundant robot arm; defining at least one constraint on motion of the redundant robot arm; generating an instruction set based upon the selected application representing a path for a robot tool attached to the redundant robot arm by operating the redundant robot arm in one of a teaching mode and a programmed mode to perform the robotic process on the workpiece; controlling movement of the redundant robot arm during the robotic process; generating a constraint algorithm to maintain a predetermined point on the redundant robot arm to at least one of be on, be near and avoid a specified constraint in a robot envelope during movement of the redundant robot arm; and generating a singularity algorithm to avoid a singularity encountered during the movement of the redundant robot arm.

DESCRIPTION OF THE DRAWINGS

The above as well as other advantages of the present invention will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
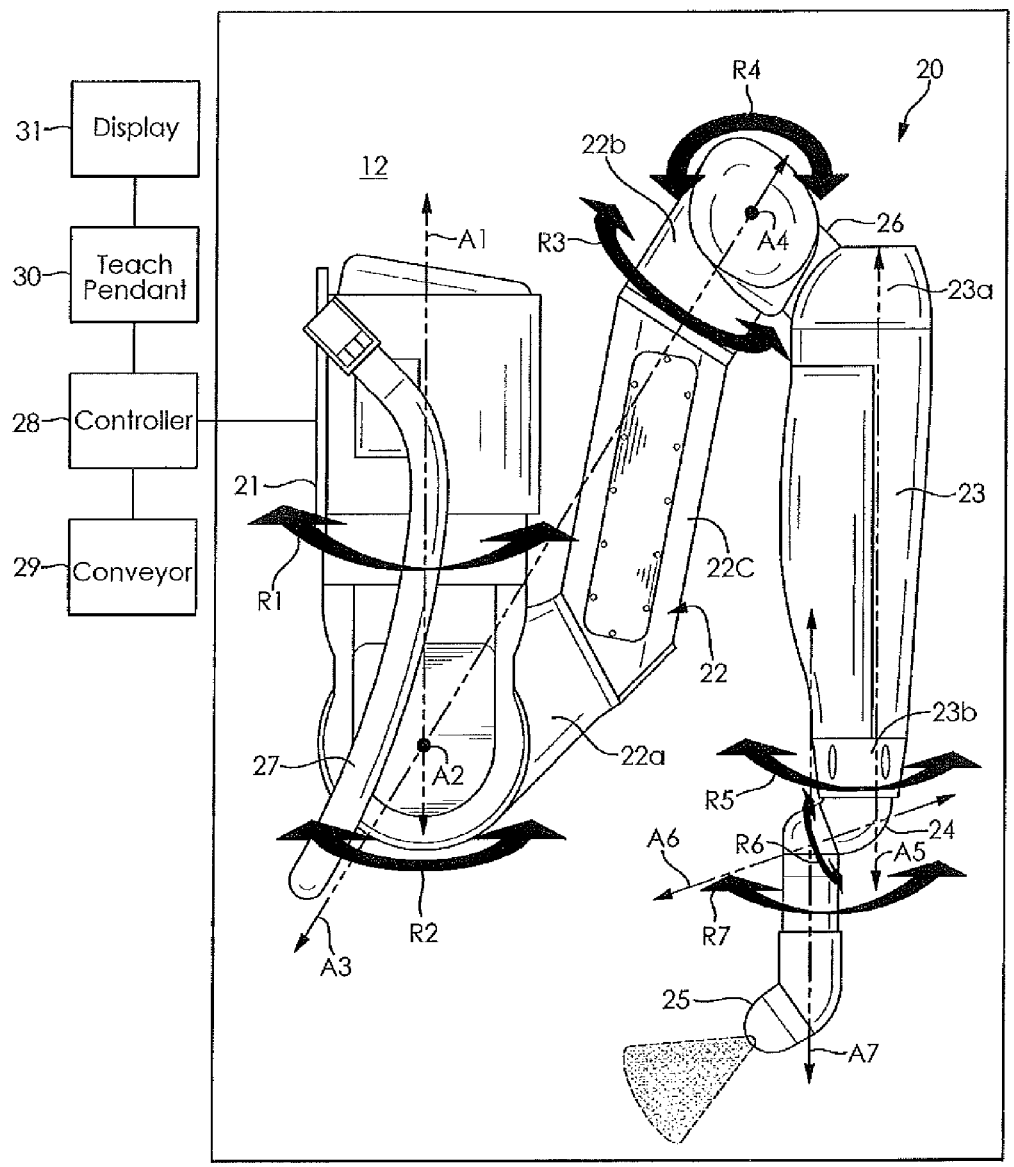
FIG. 1 is a schematic elevation side view of a seven axis redundant robot according to an embodiment of the invention.

Referring to FIG. 1, a schematic elevation side view of a seven axis redundant robot 10 according to an embodiment of the invention is shown. A robot arm 20 operates within a robot envelope 12 as illustrated schematically in FIG. 1. In the embodiment shown, the robot arm 20 is configured for paint applications. However, it is understood the robot arm 20 can be configured for any manufacturing application, as desired. The robot envelope 12 is a defined space in which the robot can move such as a paint booth for paint applications, for example, or any other robot cell or defined space, as desired.

With continuing reference to FIG. 1, the robot arm 20 is a seven axis articulated arm mounted on a modular base system 21 that is adaptable to various mounting conditions. In the embodiment shown, the modular base system 21 is oriented for attachment to a vertical surface (not shown) such as a wall within the robot envelope 12, a vertical post or column within the robot envelope 12, or any other structure configured for mounting in the robot envelope. In a non-limiting example, the base system 21 can be oriented for attachment to a wall of a paint booth, a vertical post or column of a paint booth, or any other structure configured for mounting in a paint booth.

As shown in FIG. 1, the modular base system 21 has a first direction of rotation R1 of the robot arm 20 that permits rotation of other components of the robot arm 20 about a first axis of rotation A1 which is a vertical axis with respect to the modular base system 21 permitting movement of the robot arm 20 in a horizontal plane. The other components of the robot arm 20 extend from the modular base system 21 and include, a first arm portion or inner arm portion 22 adjacent the modular base system 21, a connector 26 adjacent the first arm portion or inner arm portion 22, a second arm portion or outer arm portion 23 adjacent the connector, and a wrist 24 adjacent the outer arm portion 23. A robot tool 25 or end effector is rotatably coupled to the wrist 24. In the embodiment shown, the robot tool 25 is paint applicator for paint applications. However, it is understood the robot tool can be any robot tool 25 used for any robot operation such as material handling, machine tooling, painting, palletizing, or any other industrial robot operation, for example.

A shoulder axis of rotation or second axis of rotation A2 is aligned with and extends traverse to the first axis of rotation A1. The inner arm portion 22 is of a curved two piece construction having an end 22b and an arm 22c to provide left hand and right hand configurations and optimized reach of the robot arm 20. The arm 22c of the inner arm portion 22 is rotatably mounted at a first end 22a of the modular base system 21 for rotation about the second axis of rotation A2 in a second direction of rotation R2 permitting movement of the robot arm 20 in a vertical plane. The outer arm portion 23 has a first end 23a rotatably mounted to the end 22b of the inner arm portion 22 by the connector 26 for rotation in a fourth direction of rotation R4 about an elbow axis or fourth axis of rotation A4 generally parallel to the second axis of rotation A2. The wrist 24 rotatably couples the robot tool 25 to a second end 23b of the outer arm portion 23. The wrist 24 rotates in a fifth direction of rotation R5 about a fifth axis of rotation A5 transverse to the fourth axis of rotation A4. The wrist 24 is configured to allow rotation of the robot tool 25 in a sixth direction of rotation R6 about a tilting axis or a sixth axis of rotation A6 extending at an obtuse angle relative to the fifth axis of rotation A5. The wrist 24 can also be configured to allow rotation of the robot tool 25 in a seventh direction of rotation R7 about a seventh axis of rotation A7. The seventh axis of rotation A7 extends at an acute angle relative to the sixth axis of rotation A6.

The robot arm 20 is provided with a redundant axis of rotation or third axis of rotation A3 that extends traverse to the fourth axis of rotation A4. The second end 22b of the inner arm portion 22 is rotatably coupled to the arm 22c of the inner arm portion 22 to permit the second end 22b to rotate about the third axis of rotation A3 in a third direction of rotation R3 permitting movement of the outer arm portion 23, the wrist 24, and the robot tool 25 to rotate in the third direction of rotation R3 about the third axis of rotation A3. The third axis of rotation A3 extends through the intersection of the first axis of rotation A1 and the second axis of rotation A2 and lies in the same plane as the first axis of rotation A1. The inner arm portion 22 can be rotated about the second axis of rotation A2 to a singularity position where the first axis of rotation A1 and the third axis of rotation A3 are aligned. In such a situation, when solving inverse kinematics, only the sum of joint angle 1 and joint angle 3 can be solved, but not the individual joint angles 1 and 3. The singularity position is a position causing a singularity by collinear alignment of two or more axes of the seven axis redundant robot 10. Singularity results in undesirably high robot motions and velocities.

Additionally, a longitudinal axis of the outer arm portion 23, represented by the fifth axis of rotation A5, is offset with respect to a longitudinal axis of the inner arm portion 22, represented by the third axis of rotation A3, by the connector 26. One end of the connector 26 is rotatably attached to the end 22b of the inner arm portion 22 to rotate about the fourth axis of rotation A4. A second end of the connector 26, opposite the first end of the connector 26, is fixed to the first end 23a of the outer arm portion 23. The offset provided by the connector 26 improves a near reach capability of the robot arm 20. In the embodiment shown, where the seven axis redundant robot 10 is used for paint applications, paint lines or supply hoses in a hose loom 27 are routed along an exterior of the robot arm 20 to militate against interference of the paint lines or supply hoses with the robot arm 20.

As schematically represented in FIG. 1, the robot arm 20 is connected to a robot controller 28 positioned outside the robot envelope 12. The controller 28 generates and stores an instruction set that generates the control signals required to cause the components of the robot arm 20 to move the robot tool 25 along a desired path according to a set of stored instructions. The controller 28 controls movement of the robot arm 20 in either a teaching mode or a programmed mode. The controller 28 also receives feedback signals from the robot arm 20. The controller 28 can also receive other feedback signals from other devices operating with the seven axis redundant robot 10. For example, in a paint application, a workpiece being painted can travel in a desired direction on a conveyor 29. The controller 28 can receive feedback signals from the conveyor 29 to adjust the position of the robot tool 25 relative to the position of the workpiece on the conveyor 29 as necessary. A teach pendant 30 is connected to the controller 28 for entering robot control instructions and receiving information that is presented to a user on a display 31. The display 31 can be integral with the teach pendant 30 or can be a separate monitor.

Figure 2:
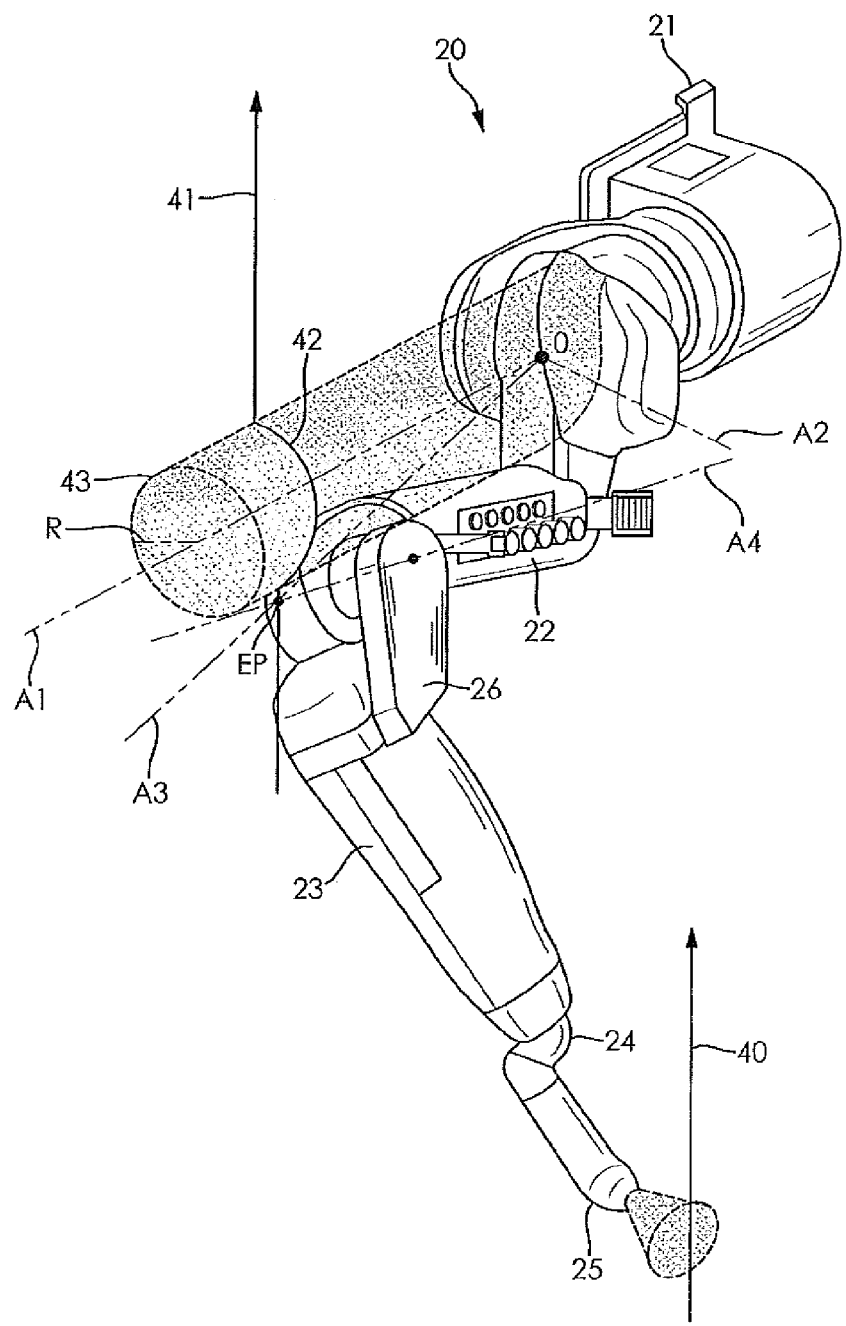
FIG. 2 is a perspective side view of a robot arm from an opposite side of the seven axis redundant robot shown in FIG. 1.

FIG. 2 is a perspective side view of the robot arm 20 of the redundant robot 10 illustrating avoidance of a singularity involving the first axis of rotation A1 and the third axis of rotation A3 of the redundant axis of rotation. The robot arm 20 of the seven axis redundant robot 10 facilitates a reduction in the robot system size by increasing the usable robot envelope 12 of the robot. The redundant axis is used to avoid obstacles, the workpiece on the conveyor, and other devices used in cooperation with the robot 10. For example, in a painting application where the workpiece being painted is a vehicle body, the redundant axis is used to avoid the vehicle body and door opener devices configured for opening doors on the vehicle body.

The robot arm 20 has an elbow point EP, which is the location of the intersection of the third axis of rotation A3 and the fourth axis of rotation A4 that is shown in FIG. 2. The method according to an embodiment of the invention militates against the singularity where both the first axis of rotation A1 and the third axis of rotation A3 are aligned along the same straight line (i.e. the elbow point EP is positioned on the first axis of rotation A1) to avoid large changes in joint angles between the first axis of rotation A1 and the third axis of rotation A3. In a line tracking application, where a tool center point (TCP) of the robot arm 20 is required to track a moving workpiece that is placed on a moving conveyor, the singularity is very difficult to predict ahead of time. Therefore, a real-time singularity avoidance is needed.

The redundancy in the robot arm 20 can be characterized as self-motion of the elbow point EP for the seven axis redundant robot 10. Given a TCP and a robot arm configuration in Cartesian space, the elbow point EP of the robot arm 20 can move along a three dimensional (3-D) curve. Therefore, a scalar factor, alpha α, can be used to fully describe the redundancy of the seven axis redundant robot 10 by considering different types of seven axis robots. For example, the seven axis redundant robot 10 can be treated as a set of six axis robots. The difference between the seven axis robot and a conventional six axis robot is that the seven axis robot has an additional axis. For example, in the embodiment shown in FIG. 2, the additional axis is the third axis of rotation A3. If the third axis of rotation A3 is fixed or set to 0, the seven axis robot is the same as a six axis robot. The six axis robot can then be virtually rotated around a selected vector so that the seven axis robot is treated as a family of infinitely many six axis robots.

Figure 3:
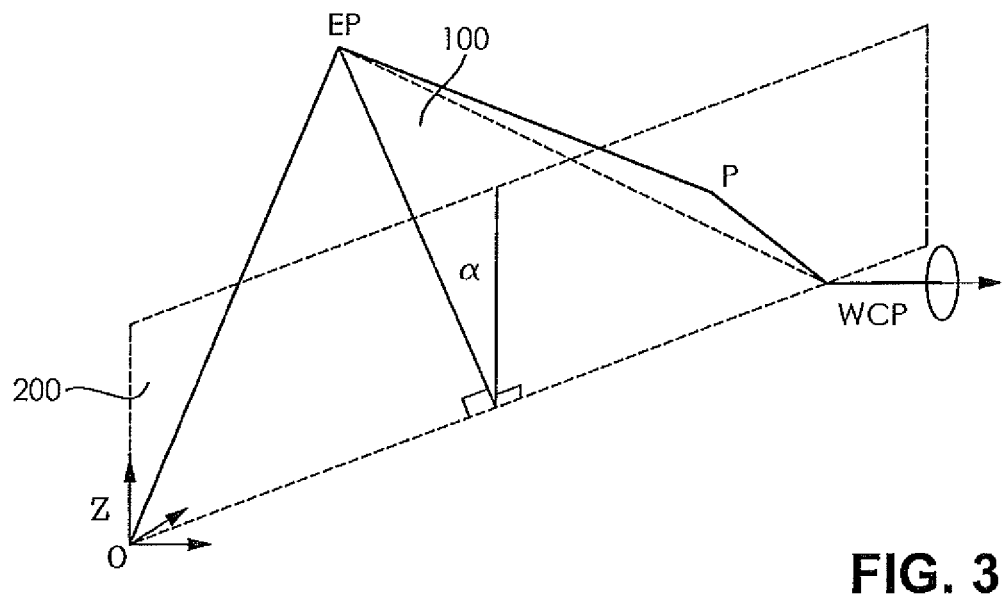
FIG. 3 is a diagram of a definition of an angle, alpha, for a seven axis redundant robot according to an embodiment of the invention.

Referring to FIG. 3, in the method according to an embodiment of the invention, alpha α is an angle. There are many ways to define alpha α to characterize the redundancy based on the mechanical structure of the seven axis redundant robot 10. In a non-limiting example, one way to use alpha α is to determine a plane formed by the elbow point EP, an origin O, and a wrist center point (WCP) to characterize the redundancy. Then, identify a reference plane 200, which is the plane formed by O, WCP, and the robot base frame z-vector Z. The angle formed between the reference plane 200 and the plane formed by the elbow point EP, the origin O, and the WCP after a rotation of the robot arm 20 can be alpha α. Alpha α is then used with a position of the robot arm 20 given in Cartesian space to solve inverse kinematics. Using this angle as alpha α facilitates teaching and playback with direct control of the elbow point EP. It is understood that other various versions of inverse kinematics can be developed with the seven axis redundant robot 20, as desired.

FIG. 3 illustrates a diagram of a definition of angle alpha α according to an embodiment of the invention. A vector is defined from the origin O, where the first axis of rotation A1 and the second axis of rotation A2 intersect, to the wrist center point WCP of the robot arm 20. A point is then defined such as the elbow point EP, which is the location of the intersection of the third axis of rotation A3 and the fourth axis of rotation A4 that is shown in FIG. 1. A plane, or elbow plane 100, includes the elbow point EP, the origin O, and the wrist center point WCP. The elbow plane 100 could also be defined as the plane including the elbow point EP, the origin O, and point P, which is the intersection of the axes A4 and A5. A fixed Cartesian reference plane 200 is defined where alpha α equals 0. The angle defined between the fixed Cartesian reference plane 200 and the elbow plane 100, as shown in FIG. 3, is the angle alpha α and can characterize the redundancy of the robot arm 20. It is understood that this definition of alpha α fully describes the redundancy for one type of redundant robot. Other points, other vectors, and other planes could be used to define alpha α, as desired.

Figure 4:
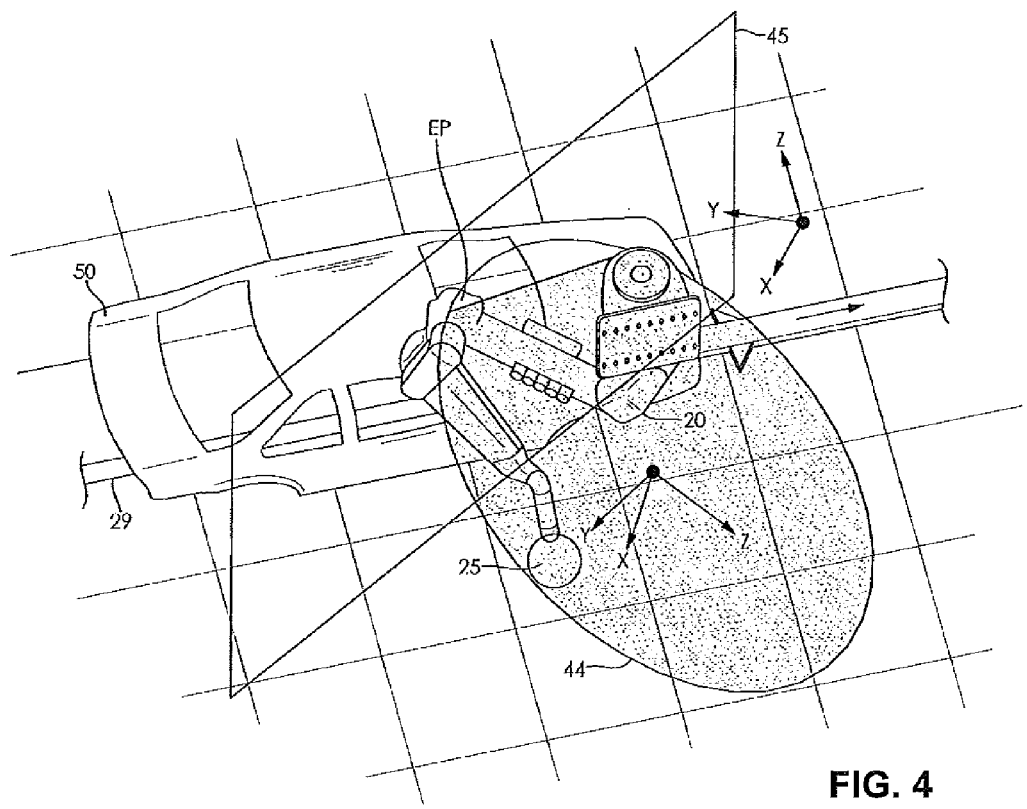
FIG. 4 is a schematic perspective view of a robot used for painting applications painting a vehicle body moving on a conveyor according to an embodiment of the invention.

Referring to FIG. 4, the robot arm 20 can be used in applications involving line tracking where the TCP of the robot arm 20 is required to track a moving workpiece that is placed on a moving conveyor. For example, the paint applicator robot tool 25 may be required to track a vehicle body 50. In order to track the vehicle body 50, the paint applicator robot tool 25 may have to move along a straight line path 40 as shown in FIG. 2 in the direction indicated by the arrowhead. Since the modular base system 21 is fixed to a wall, vertical post, or column of the robot envelope 12 such as the wall of the paint booth, the robot tool 25 is moved by rotation about the second axis of rotation A2 along the straight line path 40. As the TCP moves along the straight line path 40, the elbow point EP (the intersection of the third axis of rotation A3 and the fourth axis of rotation A4) will move along a path 41 accordingly. Such motion causes the third axis of rotation A3 to move along the path 41 in the direction of the arrowhead. If the path 41 were completely straight, there is a point where the first axis of rotation A1 and the third axis of rotation A3 would align along the same straight line causing singularity. To avoid singularity and a large change in joint angles along the first axis of rotation A1 and the third axis of rotation A3 in a short time, the method according to the invention seeks to modify the path 41 with a semicircular portion 42 that lies outside a cylinder of rotation 43 about the first axis of rotation A1. The cylinder of rotation has a radius R. According to an embodiment of the invention, to avoid singularity, the robot arm 20 is rotated about the first axis of rotation A1 to trace the semicircular portion 42 thereby maintaining the angle alpha $\alpha$ between the first axis of rotation A1 and the third axis of rotation A3. The semicircular portion 42 can be created during a path teaching session by a user who recognizes the potential singularity problem or in real time by an algorithm running in the controller 28 during a robot application such as a painting application, for example. The algorithm runs on the controller 28 to recognize a potential singularity position during real time movement of the robot arm 20 and automatically varies the path 41 of the elbow point EP to avoid the singularity.

Once alpha $\alpha$ is defined by a user, a constraint or restriction on the freedom of motion of the robot tool 25 should be defined to accomplish control of the robot arm 20 for the desired robot application. As shown in FIG. 4, during motion of the robot arm 20, the robot arm 20 should be controlled to satisfy the constraints that are described, for example, with respect to the vehicle body 50 that is moving with the conveyor 29. For the illustrated example in FIG. 4, all possible elbow points EP for a given TCP form a 3-D curve 44 which is the trajectory of the self-motion of the elbow point EP. The elbow point EP can be identified as the location of the intersection of the third axis of rotation A3 and the fourth axis of rotation A4. However, it is understood that the trajectory can be any shape, curve, or line as desired depending on the corresponding robot application. The robot arm 20 is controlled to keep the elbow point EP on a desired constraint plane 45. It is understood that many constraints other than the desired constraint plane 45 could be used to control a seven axis redundant robot 10. For example, the constraint could be defined as a stationary plane or a plane attached to the moving workpiece on a conveyor. Another constraint could be a region or space such as the space created by an open car door. Another constraint could be defined as a barrier or obstacle such as other equipment in the robot envelope 12 or the workpiece. Another constraint could be a minimization of the power consumption of the seven axis redundant robot 10. Another constraint could be a joint axis limit. Yet, another constraint could be singularity avoidance or a particular distance from singularity.

Further control of the elbow point EP of the redundant robot arm 20 in a robot application where line tracking is required can be achieved by:

a. Using a taught path as a guidance in line tracking where the actual location of the workpiece on the conveyor depends upon the conveyor motion and the location of the workpiece is different from the location where the taught path was taught.

b. Describing constrains on the elbow point EP with respect to the moving workpiece that is on the conveyor. For example, a plane can be described to constrain the elbow point EP to avoid collision during line tracking.

c. For a given TCP of the robot arm 20, controlling the elbow point EP in such a way that no collision between the robot arm 20 and the workpiece will occur.

d. Considering the following constrains:
   i. collision avoidance between the robot arm 20 and workpieces that have various shapes;
   ii. collision avoidance between the robot arm 20 and walls or structures in the robot envelope 12; and
   iii. smoothness and control of the motions of the robot arm 20.

As shown in FIG. 4, the robot arm 20 is mounted adjacent the conveyor 29 that is moving a vehicle body 50 past the robot arm 20. In the method according to an embodiment of the invention, all of the elbow points EP and the desired constraint plane 45 can be displayed on the display 31 of the teach pendant 30, for example, for the user to visualize control of the elbow point EP of the robot arm 20. However, it is understood the elbow points EP and the desired constraint plane 45 can be displayed on any display such as a separate monitor. Because of redundancy, the robot arm 20 has a self-motion for a given TCP. The visualization on the display of the teach pendant 30 as illustrated in FIG. 4 allows a user to see all possible elbow points EP along the curve 44 as alpha $\alpha$ varies. The visualization also allows a user to see the desired constraint plane 45. Thus, the user can see the desired constrains of the elbow point EP of the robot arm 20 on the display 31. Especially, in a tracking application, the desired constrains of the elbow point EP of the robot are represented with respect to the workpieces that are moving with the conveyor 29. This visualization makes teaching of required motions easy and intuitive. The user can easily know whether or not the elbow control works in the application and how to make it work. A touch screen display on the teach pendant 30 or other tools or devices can be used in cooperation with the teach pendant 30 so the user can easily move the elbow point EP of the robot arm 20 to a desired location.

Figure 5:
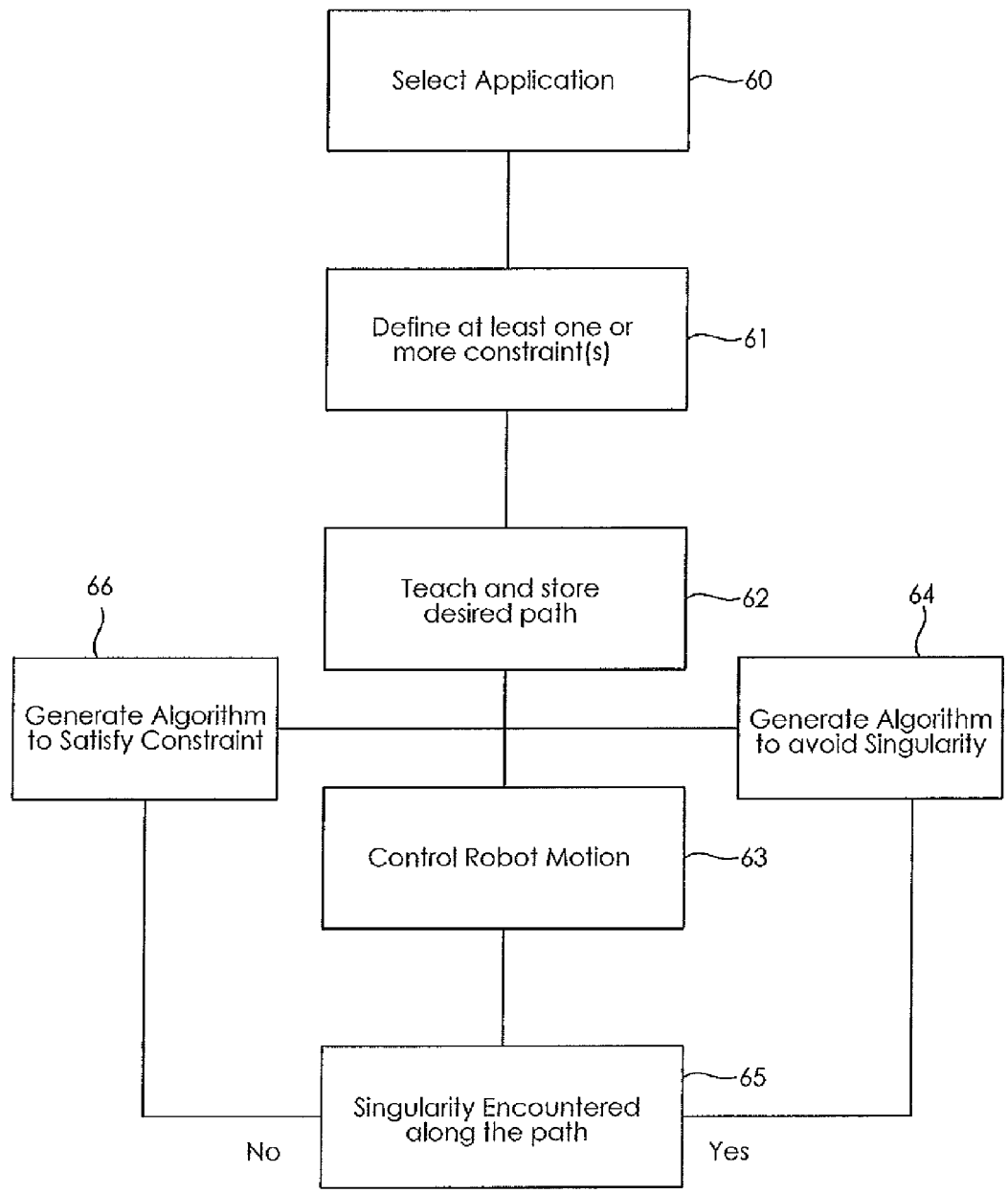
FIG. 5 is a flow diagram of the method according to an embodiment of the invention.

FIG. 5 is a flow diagram of the method according to an embodiment of the invention. In a step 60, a user selects an application for the robot arm 20. For example, the application can be a painting application as shown in FIG. 4. However, the application can be any robot application, as desired. In a step 61, the user defines at least one or more constraint(s) for the robot arm 20 such as alpha $\alpha$, for example. In a step 62, the user teaches and stores a desired robot path into the robot controller 28 using information shown on the display 31 of the teach pendant 30. Then, in a step 63, the controller 28 operates the robot arm 20 to follow the desired path in either a teaching mode or programmed mode. If singularity is encountered along the path as shown in step 65, a singularity avoidance algorithm is generated in a step 64 to automatically avoid any singularity positions of the robot arm 20. If singularity is not encountered, in step 66, a real time algorithm is used to satisfy the constraint defined.

Figure 6:
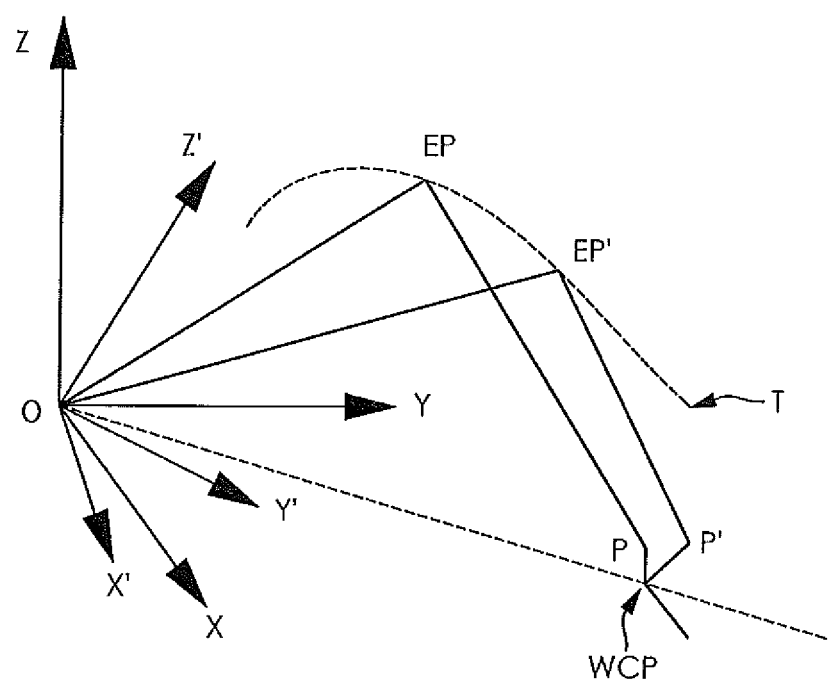
FIG. 6 is a diagram of a trace of an elbow point as an angle, alpha, changes for a seven axis robot according to an embodiment of the present invention.

Referring to FIG. 6, for the redundant robot with an offset wrist, the trace of the elbow point EP may be limited and may not be a closed curve in space, depending upon the wrist center point WCP as shown in FIG. 6. As shown, the corresponding trace T of the elbow point EP of the robot is no longer a circular curve. Given a wrist center point WCP, the trace of the elbow point EP is a fixed three dimensional curve in space but it is difficult to determine the curve in a formula. This problem is solved by the above-described method according to the invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for controlling a redundant robot arm comprising the steps of:
    selecting an application for performing a robotic process on a workpiece;
    generating an instruction set based upon the selected application representing a path for a robot tool attached to the redundant robot arm that is calculated with an inverse kinematics method directly using a Cartesian position of a tool center point of the tool and a scalar factor to produce joint angles for the redundant robot arm; and
    operating the redundant robot arm in a programmed mode to perform the robotic process on the workpiece according to the generated instruction set.

2. The method according to claim 1 including modifying the path of an elbow point of the redundant robot arm to avoid a singularity position of the redundant robot arm.

3. The method according to claim 1 including controlling the redundant robot arm during the robotic process to maintain a predetermined point on the redundant robot arm to at least one of be on, be near and avoid a specified constraint in a robot envelope.

4. The method according to claim 3 including where the specified constraint is an elbow plane including an elbow point of the redundant robot arm and using the elbow plane to define the scalar factor.

5. The method according to claim 3 including controlling the tool center point of the tool to track the workpiece moving on a conveyor where the specified constraint is one of stationary relative to the conveyor and attached to the workpiece.

6. The method according to claim 3 where the specified constraint is at least one of a region, a space, a barrier or an obstacle in the robot envelope or a minimization of a power consumption of the redundant robot arm or a joint axis limit of the redundant robot arm.

7. The method according to claim 6 wherein the redundant robot arm is controlled to prevent a collision between the redundant robot arm and the specified constraint.

8. The method according to claim 3 including displaying a visual representation of the redundant robot arm, the workpiece, the specified constraint and a 3-D curve of a trajectory of self-motion of the predetermined point.

9. The method according to claim 1 wherein the redundant robot arm includes an offset wrist.

10. The method according to claim 1 wherein the redundant robot arm has seven axes of rotation.

11. A method for controlling a redundant robot arm comprising the steps of:
    selecting an application for performing a robotic process on a workpiece;
    generating an instruction set based upon the selected application representing a path for a robot tool attached to the redundant robot arm that is calculated with an inverse kinematics method directly using a Cartesian position of a tool center point of the tool and a scalar factor to produce joint angles for the robot including:
        selecting a vector between a robot base of the redundant robot arm and a wrist center point of the redundant robot arm and treating the redundant robot arm as an infinite series of six axis robots rotating around the selected vector;
        using the scalar factor and the selected vector to convert a given Cartesian position of the redundant robot arm to a Cartesian position of a six axis robot;
        using the Cartesian position of the six axis robot to solve inverse kinematics for six intermediate joint angles;
        using the six intermediate joint angles to compute locations of an elbow point and a wrist center point of the six axis robot;
        using the scalar factor and the selected vector to convert the six axis robot elbow point and the six axis robot wrist center point to an elbow point and the wrist center point respectively of the redundant robot arm;
        using the elbow point and the wrist center point of the redundant robot arm and a location of the given Cartesian position to solve for a first four axes joint angles of the redundant robot arm;
        using an orientation part of the given Cartesian position and the first four axes joint angles to solve for remaining wrist joint angles five, six and seven of the redundant robot arm; and
    operating the redundant robot arm in a programmed mode to perform the robotic process on the workpiece according to the generated instruction set.

12. The method according to claim 11 including modifying the path of the elbow point of the redundant robot arm to avoid a singularity position of the redundant robot arm.

13. The method according to claim 11 including controlling the redundant robot arm during the robotic process to maintain a predetermined point on the redundant robot arm to at least one of be on, be near and avoid a specified constraint in a robot envelope.

14. The method according to claim 13 including where the specified constraint is an elbow plane including the elbow point of the redundant robot arm and using the elbow plane to define the scalar factor.

15. The method according to claim 13 including controlling the tool center point of the tool to track the workpiece moving on a conveyor where the specified constraint is one of stationary relative to the conveyor and attached to the workpiece.

16. The method according to claim 13 where the specified constraint is at least one of a region, a space, a barrier or an obstacle in the robot envelope or a minimization of a power consumption of the redundant robot arm or a joint axis limit of the redundant robot arm.

17. The method according to claim 16 wherein the redundant robot arm is controlled to prevent a collision between the redundant robot arm and the specified constraint.

18. The method according to claim 13 including displaying a visual representation of the redundant robot arm, the workpiece, the specified constraint and a 3-D curve of a trajectory of self-motion of the elbow point.

19. The method according to claim 11 wherein the redundant robot arm includes an offset wrist.

20. The method according to claim 11 wherein the redundant robot arm has seven axes of rotation.

* * * * *